(12) United States Patent
Enomoto et al.

(10) Patent No.: US 11,685,425 B2
(45) Date of Patent: Jun. 27, 2023

(54) ELECTRIC POWER STEERING DEVICE

(71) Applicant: SHOWA CORPORATION, Gyoda (JP)

(72) Inventors: Satoshi Enomoto, Haga-gun (JP); Takayuki Tetsuka, Haga-gun (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 117 days.

(21) Appl. No.: 17/061,034

(22) Filed: Oct. 1, 2020

(65) Prior Publication Data

US 2021/0016822 A1 Jan. 21, 2021

Related U.S. Application Data

(63) Continuation-in-part of application No. PCT/JP2018/019192, filed on May 17, 2018.

(51) Int. Cl.
*B62D 5/04* (2006.01)
*B62D 3/12* (2006.01)
*F16H 7/02* (2006.01)

(52) U.S. Cl.
CPC .............. *B62D 5/0403* (2013.01); *B62D 3/12* (2013.01); *B62D 5/0424* (2013.01); *F16H 7/02* (2013.01)

(58) Field of Classification Search
CPC ....... B62D 5/0403; B62D 3/12; B62D 5/0424
See application file for complete search history.

(56) References Cited

U.S. PATENT DOCUMENTS

| 4,735,271 | A | 4/1988 | Shimizu |
| 2005/0133297 | A1 | 6/2005 | Chikaraishi |
| 2007/0095600 | A1 | 5/2007 | Jo et al. |
| 2011/0000737 | A1 | 1/2011 | Nagase et al. |
| 2016/0272238 | A1 | 9/2016 | Taniguchi et al. |

FOREIGN PATENT DOCUMENTS

| DE | 102006042387 A1 | * | 3/2008 | ........... B62D 5/0403 |
| GB | 2524605 A | * | 9/2015 | ............... B62D 3/12 |
| JP | 62-244761 A | | 10/1987 | |
| JP | 2005-349884 A | | 12/2005 | |
| JP | 2006-027489 A | | 2/2006 | |

(Continued)

OTHER PUBLICATIONS

International Search Report dated Jul. 10, 2018 for the corresponding PCT International Patent Application No. PCT/JP2018/019192.

*Primary Examiner* — Jacob D Knutson
(74) *Attorney, Agent, or Firm* — Leason Ellis LLP (57) ABSTRACT

An electric power steering device includes: an electric motor; a rack shaft configured to move axially; a conversion unit configured to convert rotational driving force of the moto into movement of the rack shaft; a first housing configured to cover a part of an outer surface of the rack shaft and including a first leg portion fixed to a vehicle; a second housing configured to cover a part of the outer surface of the rack shaft and including a fourth connecting portion covering the conversion unit and a second leg portion fixed to the vehicle; and an intermediate housing disposed between the first and second housings and configured to cover a part of the outer surface of the rack shaft 3 and including a motor support portion supporting the motor.

15 Claims, 7 Drawing Sheets

(56) References Cited

FOREIGN PATENT DOCUMENTS

| | | | |
|---|---|---|---|
| JP | 2007-112411 A | 5/2007 | |
| JP | 2009-241785 A | 10/2009 | |
| JP | 2014-004981 A | 1/2014 | |
| JP | 2014-061754 A | 4/2014 | |
| JP | 2014-162348 A | 9/2014 | |
| JP | 2016-013798 A | 1/2016 | |
| JP | 2016-174438 A | 9/2016 | |
| WO | WO-2003/011674 A | 2/2003 | |
| WO | WO-2004/018279 A | 3/2004 | |
| WO | WO-2004018279 A1 * | 3/2004 | ........... B62D 5/0424 |

* cited by examiner

ELECTRIC POWER STEERING DEVICE

CROSS-REFERENCE TO RELATED APPLICATIONS

This application is a continuation-in-part of PCT application No. PCT/JP2018/019192 filed on May 17, 2018, the content of which is incorporated herein by reference in its entirety.

FIELD OF THE INVENTION

The present invention relates to an electric power steering device.

BACKGROUND OF THE INVENTION

An electric power steering device has been proposed that uses a belt transmission mechanism to convert driving force of an electric motor into movement of a rack shaft by use of a belt.

For example, an electric power steering device disclosed in Japanese Patent Application Laid-Open Publication No. 2006-027489 includes: a motor configured to supply steering assist force; a rack shaft configured to turn traveling wheels; and a belt transmission mechanism composed of an input pulley formed integrally and coaxially with a motor rotation shaft and cantilevered, an output pulley coupled to a drive conversion device for conversion into axial movement of the rack shaft, and a driving belt wound between the input pulley and the output pulley.

Technical Problem

A housing that supports the rack shaft so as to allow it to move axially and also supports the electric motor is required to be provided with multiple fixed portions at which the housing is fixed to a body of a vehicle equipped with the electric power steering device. Parallelism (angular phase difference) between mounting surfaces of the respective fixed portions for mounting onto the vehicle is desirably small.

Meanwhile, the belt, the pulleys on which the belt is stretched, and the like may be assembled on a housing supporting them such that they are exposed to the outside of the housing to allow for assembling of the belt or tension adjustment of the belt, and the belt and the like may be covered with another housing after the belt is assembled. When the belt, the pulleys and the like are accommodated using two housings, it is important to ensure sealing between connecting portions of the two housings.

An object of the present invention is to provide an electric power steering device that ensures sealing between connecting portions of two housings accommodating the belt and the like while reducing parallelism between mounting surfaces of respective multiple fixed portions.

SUMMARY OF THE INVENTION

Solution to Problem

With the above object in view, an aspect of the present invention is an electric power steering device including: an electric motor; a rack shaft configured to move in an axial direction; a conversion unit configured to convert rotational driving force of the electric motor into movement of the rack shaft; a first housing configured to cover a part of an outer surface of the rack shaft, the first housing including a first fixed portion configured to be fixed to a vehicle; a second housing configured to cover a part of the outer surface of the rack shaft, the second housing including one of a support portion and a cover portion, the support portion being configured to support the electric motor, the cover portion being configured to cover the conversion unit, the second housing including a second fixed portion configured to be fixed to the vehicle; and a third housing disposed between the first housing and the second housing and configured to cover a part of the outer surface of the rack shaft, the third housing including the other of the support portion and the cover portion.

Advantageous Effects of Invention

The present invention ensures sealing between connecting portions of two housings accommodating the belt and the like while reducing parallelism between mounting surfaces of respective multiple fixed portions.

DETAILED DESCRIPTION OF THE INVENTION

Embodiments of the present invention will be described below in detail with reference to the attached drawings.

First Embodiment

Figure 1:
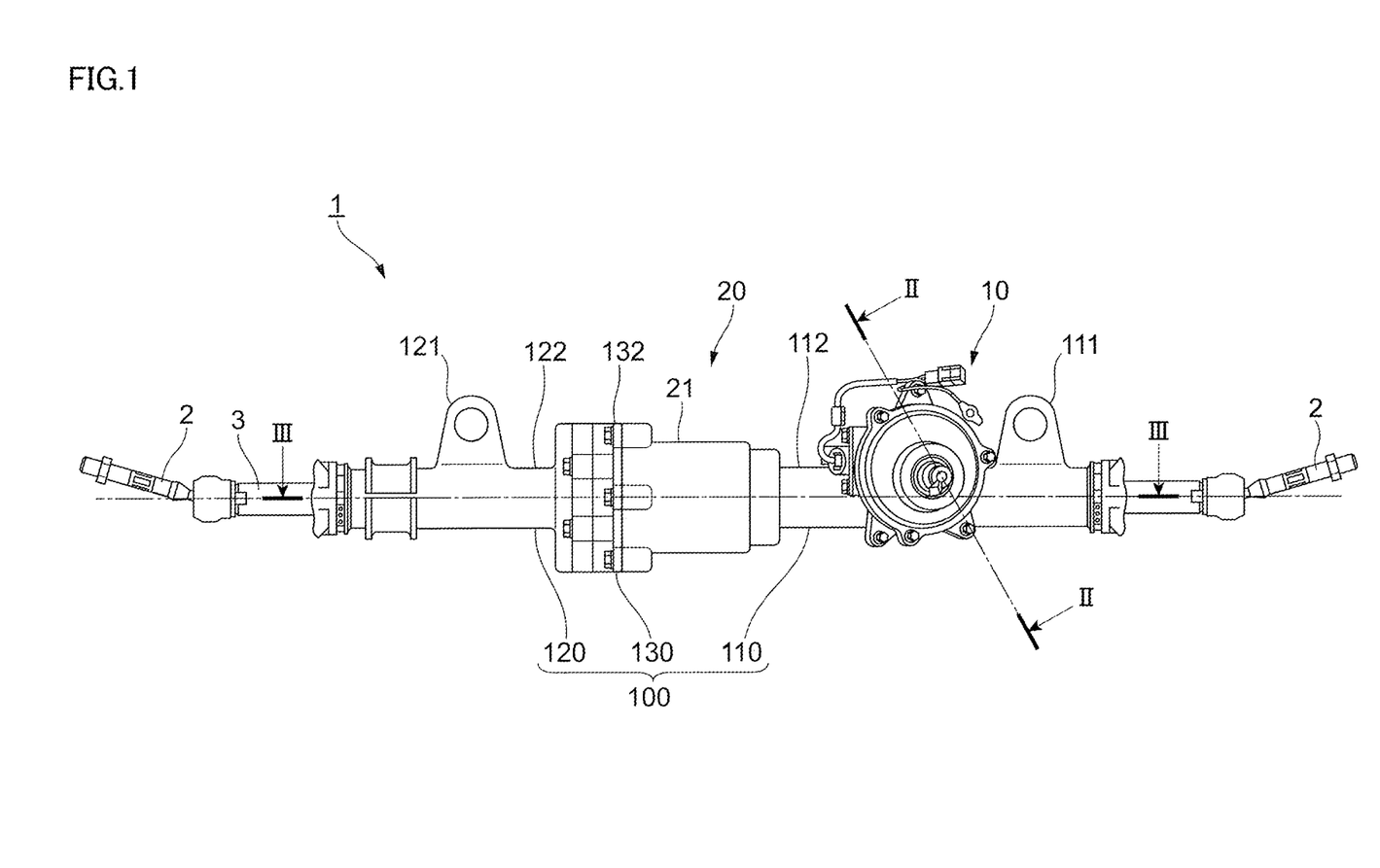
FIG. 1 is a schematic configuration diagram of an electric power steering device according to the first embodiment.

FIG. 1 is a schematic configuration diagram of an electric power steering device 1 according to the first embodiment.

As shown in FIG. 1, the electric power steering device (hereinafter may be referred to as a "steering device") 1 according to the first embodiment is a device to change a traveling direction of a vehicle to any direction. The steering device 1 according to the first embodiment is a rack-assist type power steering device.

The steering device 1 includes tie rods 2 respectively connected to left and right wheels (not shown) as rolling wheels via respective knuckle arms (not shown), and a rack shaft 3 connected to the tie rods 2. The steering device 1 further includes a transmission mechanism unit 10 to transmit steering force from a steering wheel (not shown) installed in the vehicle to the rack shaft 3. The steering device 1 further includes an assist unit 20 that includes an electric motor 21 and assists movement of the rack shaft 3 by transmitting driving force of the electric motor 21 to the rack shaft 3 as steering assist force.

In the following description, a longitudinal direction of the rack shaft 3 may be referred to as an "axial direction", and a circumferential direction around an axis of the rack shaft 3 may be referred to as a "circumferential direction".

The steering device 1 further includes a housing 100 that covers a part of an outer surface of the rack shaft 3 and supports the rack shaft 3 such that the rack shaft 3 can move in the axial direction. The housing 100 is composed the following three housings divided in the axial direction: a first housing 110 including a first leg portion 111 fixed to a vehicle body (not shown) and the like of the vehicle; a second housing 120 including a second leg portion 121; and an intermediate housing 130 disposed between the first housing 110 and the second housing 120.

The first housing 110 includes a first cylindrical portion 112 allowing for insertion of the rack shaft 3 therein. The first housing 110 further includes a transmission mechanism supporting portion 113 (see FIG. 2) supporting the transmission mechanism unit 10.

The first leg portion 111 is provided so as to protrude from the first cylindrical portion 112 and includes a cylindrical portion formed with a through-hole allowing for insertion of a bolt used to fix the first leg portion 111 to the vehicle body (not shown), and a portion connecting this cylindrical portion and the first cylindrical portion 112. A lower end face of the first leg portion 111 (a face facing in an opposite direction from a direction in which an input shaft 12, which will be described later, protrudes) serves as a mounting surface 111*a* (see FIG. 5) that is placed on the vehicle body when the steering device 1 is fixed to the vehicle body.

The transmission mechanism supporting portion 113 will be detailed later.

The second housing 120 includes a second cylindrical portion 122 allowing for insertion of the rack shaft 3 therein.

The second leg portion 121 is provided so as to protrude from the second cylindrical portion 122 and includes a cylindrical portion formed with a through-hole allowing for insertion of a bolt used to fix the second leg portion 121 to the vehicle body (not shown), and a portion connecting this cylindrical portion and the second cylindrical portion 122. A lower end face of the second leg portion 121 (a face facing in an opposite direction from a direction in which the input shaft 12 protrudes) serves as a mounting surface 121*a* (see FIG. 5) that is placed on the vehicle body when the steering device 1 is fixed to the vehicle body.

The intermediate housing 130 includes an intermediate cylindrical portion 131 (see FIG. 3) allowing for insertion of the rack shaft 3 therein, and a motor support portion 132 supporting the electric motor 21.

The motor support portion 132 will be detailed later.

(Transmission Mechanism Unit 10)

Figure 2:
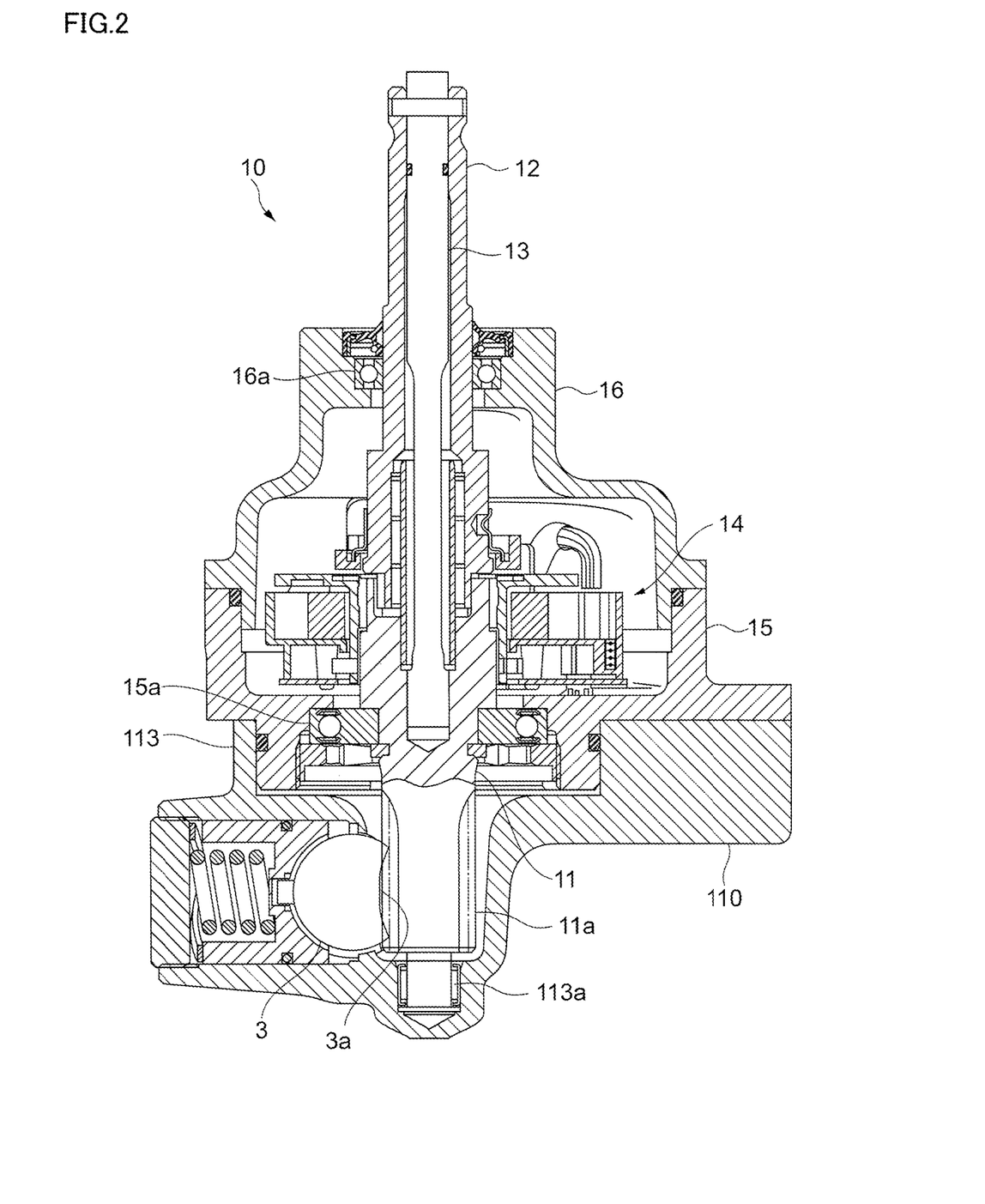
FIG. 2 is a sectional view taken along the line II-II in FIG. 1, illustrating a sectional view of a transmission mechanism unit.

FIG. 2 is a sectional view taken along the line II-II in FIG. 1, illustrating a sectional view of the transmission mechanism unit 10.

The transmission mechanism unit 10 includes a pinion shaft 11 formed with a pinion 11*a* constituting a rack pinion mechanism with a rack 3*a* formed on the rack shaft 3, and the input shaft 12 to which steering force from the steering wheel (not shown) is input. The transmission mechanism unit 10 further includes a torsion bar 13 connected to the pinion shaft 11 and the input shaft 12.

The transmission mechanism unit 10 further includes a torque sensor 14 detecting steering torque of the steering wheel on the basis of a torsion amount of the torsion bar 13. The torque sensor 14 outputs steering torque detection results to an electronic control unit (ECU) (not shown). The ECU controls the electric motor 21 on the basis of the steering torque detected by the torque sensor 14.

The transmission mechanism unit 10 further includes a sensor housing 15 covering a periphery of the torque sensor 14 and a cover 16 covering an opening of the sensor housing 15.

The sensor housing 15 is fixed to the transmission mechanism supporting portion 113 of the first housing 110 with bolts (not shown), and the cover 16 is fixed to the sensor housing 15 with bolts (not shown).

The transmission mechanism supporting portion 113 and the sensor housing 15 include a bearing 113*a* and a bearing 15*a*, respectively, both of which rotatably support the pinion shaft 11. The cover 16 includes a bearing 16*a* rotatably supporting the input shaft 12. The sensor housing 15 and the cover 16 are fixed to the transmission mechanism supporting portion 113, whereby the pinion shaft 11 and the torque sensor 14 are accommodated inside while one ends of the input shaft 12 and the torsion bar 13 are protruded to the outside.

(Assist Unit 20)

Figure 3:
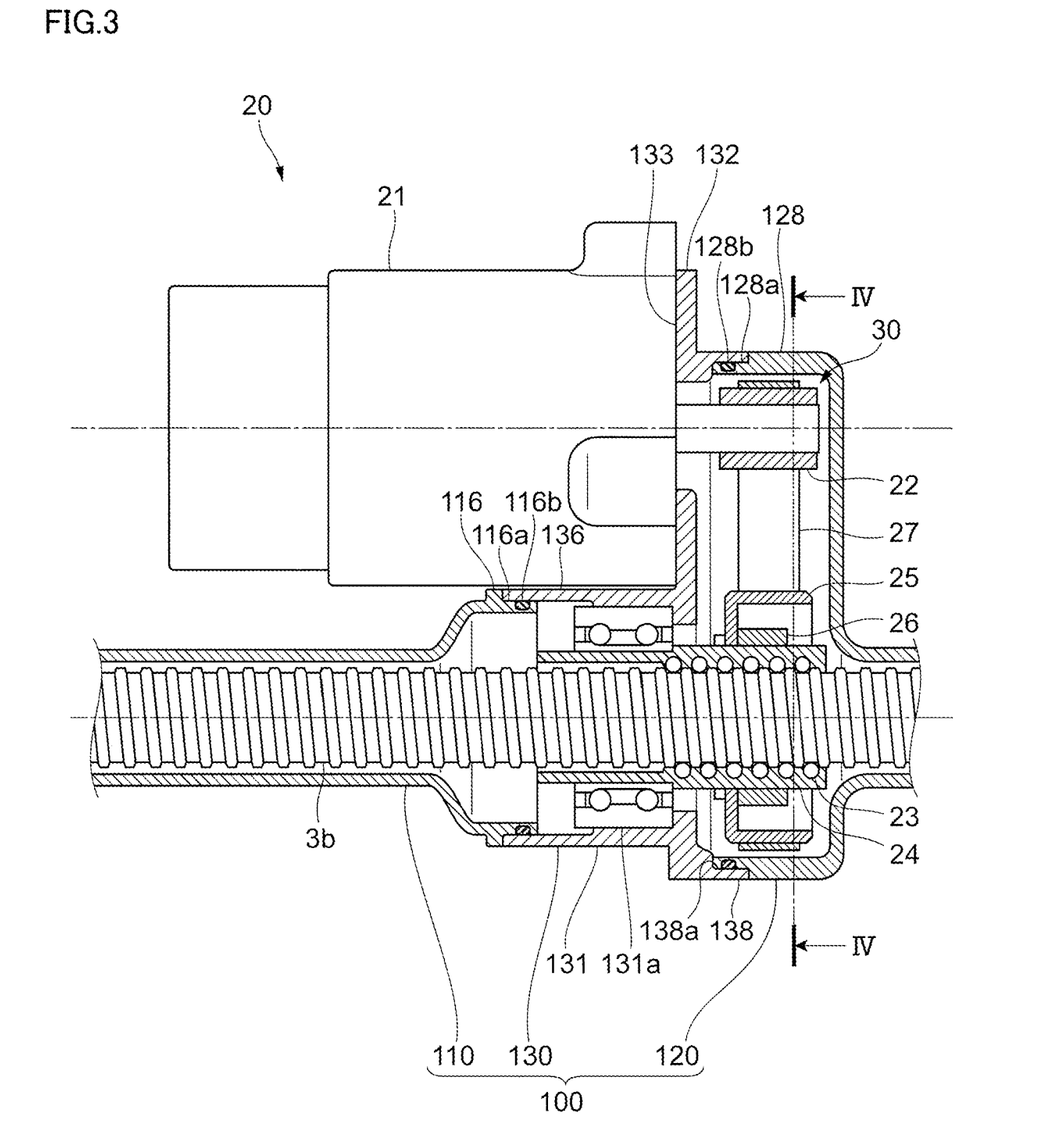
FIG. 3 is a sectional view taken along the line III-III in FIG. 1, illustrating a sectional view of an assist unit.

FIG. 3 is a sectional view taken along the line III-III in FIG. 1, illustrating a sectional view of the assist unit 20.

Figure 4:
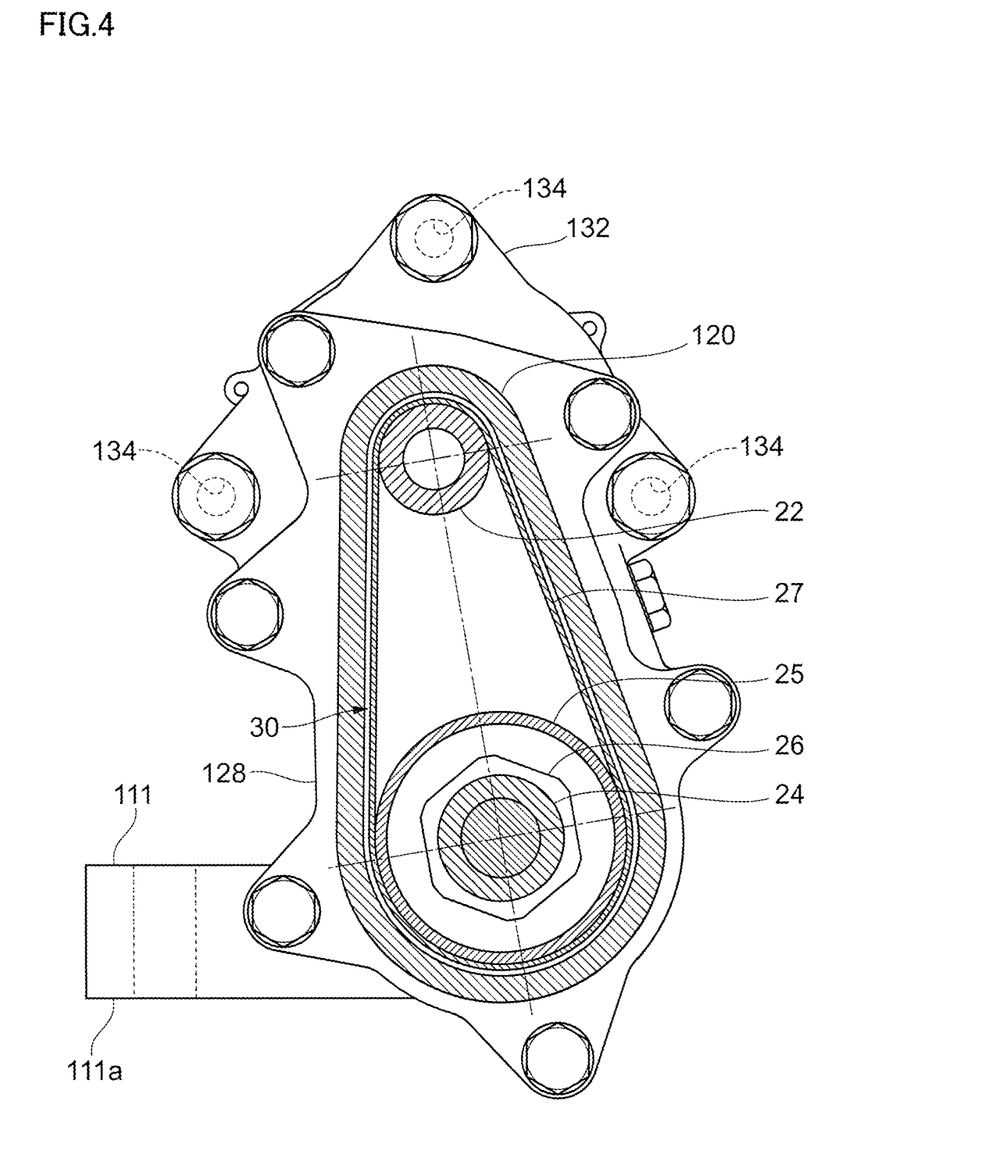
FIG. 4 is a sectional view taken along the line IV-IV in FIG. 3, illustrating the assist unit as viewed in an axial direction.

FIG. 4 is a sectional view taken along the line IV-IV in FIG. 3, illustrating the assist unit 20 as viewed in an axial direction.

Figure 5:
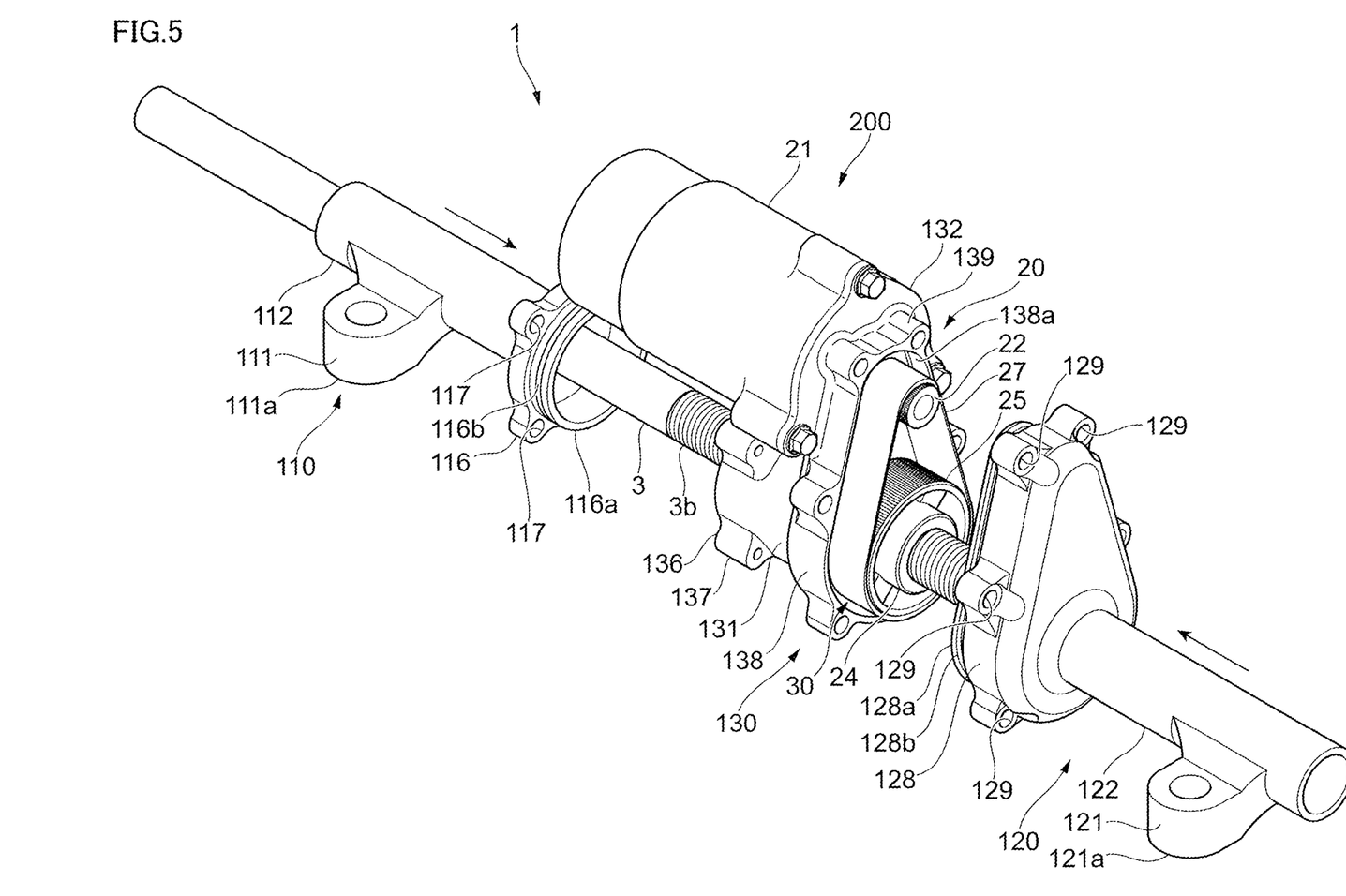
FIG. 5 is a perspective view of a first housing, an intermediate housing, and a second housing before assembly.

FIG. 5 is a perspective view of the first housing 110, the intermediate housing 130, and the second housing 120 before assembly.

The assist unit 20 includes the electric motor 21 and a driving pulley 22 attached to an output shaft of the electric motor 21. The assist unit 20 includes a number of balls 23 and a ball nut 24 attached via the balls 23 to a ball screw 3*b* formed on the rack shaft 3. The assist unit 20 further includes a driven pulley 25 rotating together with the ball nut 24, and a lock nut 26 fixing the driven pulley 25 to an outer circumference of the ball nut 24. The assist unit 20 further includes one endless belt 27 stretched between the driving pulley 22 and the driven pulley 25.

The driving pulley 22, the balls 23, the ball nut 24, the driven pulley 25, the belt 27 and the like constitute a conversion unit 30 to convert rotational driving force of the electric motor 21 into axial movement of the rack shaft 3.

The intermediate cylindrical portion 131 of the intermediate housing 130 includes a bearing 131*a* rotatably supporting the ball nut 24 of the assist unit 20.

The motor support portion 132 of the intermediate housing 130 includes a motor mounting surface 133 on which the electric motor 21 is mounted. To ensure sealing between the electric motor 21 and the intermediate housing 130, the motor mounting surface 133 is processed to have a small surface roughness. The motor support portion 132 is formed with multiple (three in the present embodiment) through-holes 134 each for insertion of a bolt to fix the electric motor 21.

The intermediate housing 130 has no portion that overlaps the motor mounting surface 133 in the axial direction at a position closer to the first housing 110 than the motor mounting surface 133. For example, the intermediate cylindrical portion 131 is provided at a position that does not overlap the motor mounting surface 133 in the axial direction. This allows the motor mounting surface 133, which is required to ensure sealing between the motor mounting surface 133 and the electric motor 21 mounted thereon, to be easily processed.

(Connecting Portion Between the First Housing 110 and the Intermediate Housing 130, and a Connecting Portion Between the Intermediate Housing 130 and the Second Housing 120)

The first cylindrical portion 112 of the first housing 110 is provided, at its end facing the intermediate housing 130, with a first connecting portion 116 that connects to an end of the intermediate cylindrical portion 131 of the intermediate housing 130 facing the first housing 110. The first connecting portion 116 is formed with multiple (four in the present embodiment) through-holes 117 each for insertion of a bolt.

The intermediate cylindrical portion 131 of the intermediate housing 130 is provided, at its end facing the first housing 110, with a second connecting portion 136 that connects to the first connecting portion 116 of the first cylindrical portion 112 of the first housing 110. The second connecting portion 136 includes multiple (four in the present embodiment) bosses 137 each formed with a female thread to be screwed with the corresponding bolt for fixing the first connecting portion 116 of the first housing 110.

The first connecting portion 116 of the first housing 110 includes a first protrusion 116a protruding from a mating surface of the first connecting portion 116 at which the first connecting portion 116 mates with the second connecting portion 136 of the intermediate housing 130. The first protrusion 116a of the first connecting portion 116 and an end of the second connecting portion 136 (end of the intermediate cylindrical portion 131 facing the first connecting portion 116) have a round shape when viewed in the axial direction. The first protrusion 116a of the first connecting portion 116 is fitted with an O-ring 116b around its outer periphery. The first connecting portion 116 and the second connecting portion 136 are connected to each other with the first protrusion 116a of the first connecting portion 116 fitted into an inner surface of the intermediate cylindrical portion 131 of the intermediate housing 130. The O-ring 116b seals a gap between the first protrusion 116a of the first connecting portion 116 and the intermediate cylindrical portion 131 of the intermediate housing 130.

The intermediate housing 130 is provided, at its end facing the second housing 120, with a third connecting portion 138 that connects to an end of the second housing 120 facing the intermediate housing 130.

The second housing 120 is provided, at its end facing the intermediate housing 130, with a fourth connecting portion 128 that connects to the third connecting portion 138 of the intermediate housing 130. The second cylindrical portion 122 of the second housing 120 is provided on an opposite side of the fourth connecting portion 128 from the intermediate housing 130.

The third connecting portion 138 of the intermediate housing 130 and the fourth connecting portion 128 of the second housing 120 are connected to each other to form an accommodating portion accommodating the conversion unit 30 of the assist unit 20. When viewed in the axial direction, the third connecting portion 138 of the intermediate housing 130 and the fourth connecting portion 128 of the second housing 120, in other words the accommodating portion, have a shape contoured to a shape of an outer peripheral surface of the endless belt 27 stretched between the driving pulley 22 and the driven pulley 25 of the assist unit 20, as shown in FIG. 4. The driving pulley 22, the driven pulley 25, and the belt 27 of the assist unit 20 protrude from the third connecting portion 138 to the outside, and the outer periphery of the belt 27 is covered with the fourth connecting portion 128 of the second housing 120.

The third connecting portion 138 of the intermediate housing 130 includes multiple (six in the present embodiment) bosses 139 each formed with a female thread to be screwed with a bolt for fixing the fourth connecting portion 128 of the second housing 120. Meanwhile, the fourth connecting portion 128 of the second housing 120 is formed with through-holes 129, each of which is for insertion of the corresponding bolt, in the same number as the bosses 139 (six in the present embodiment).

The fourth connecting portion 128 of the second housing 120 includes a fourth protrusion 128a protruding from a mating surface of the fourth connecting portion 128 at which the fourth connecting portion 128 mates with the third connecting portion 138 of the intermediate housing 130. Meanwhile, the third connecting portion 138 of the intermediate housing 130 is formed with a third recess 138a extending inward from a mating surface of the third connecting portion 138 at which the third connecting portion 138 mates with the fourth connecting portion 128 of the second housing 120. When viewed in the axial direction, the fourth protrusion 128a of the fourth connecting portion 128 and the third recess 138a of the third connecting portion 138 have a shape contoured to the shape of the outer peripheral surface of the belt 27, as shown in FIG. 4. The fourth protrusion 128a of the fourth connecting portion 128 is fitted with an O-ring 128b around its outer periphery. The third connecting portion 138 and the fourth connecting portion 128 are connected to each other with the fourth protrusion 128a of the fourth connecting portion 128 fitted into the third recess 138a of the third connecting portion 138. The O-ring 128b seals a gap between the fourth protrusion 128a of the fourth connecting portion 128 and the third recess 138a of the third connecting portion 138.

(Assembly Method)

The electric motor 21 is mounted on the motor mounting surface 133 of the motor support portion 132 of the intermediate housing 130, and the driving pulley 22 is attached to the output shaft of the electric motor 21.

The rack shaft 3 having the balls 23 and the ball nut 24 attached to the ball screw 3b formed on the rack shaft 3 is fitted into the intermediate cylindrical portion 131 of the intermediate housing 130. Then, the driven pulley 25 is attached to an outer surface of the ball nut 24.

Then, the belt 27 is stretched between the driving pulley 22 and the driven pulley 25, and tension of the belt 27 is adjusted.

The driving pulley 22 attached to the output shaft of the electric motor 21 and the driven pulley 25 attached to the outer peripheral surface of the ball nut 24 protrude from the third connecting portion 138 of the intermediate housing 130 to the outside. This allows the belt 27 to be easily stretched between the driving pulley 22 and the driven pulley 25 and also allows tension of the belt 27 to be easily adjusted.

Through the above work, an intermediate housing unit 200 including the intermediate housing 130, the electric motor 21, and the conversion unit 30 (the driving pulley 22, the driven pulley 25, the balls 23, and the ball nut 24) is assembled.

The first housing 110 is fixed to a first assembly jig (not shown) with the bolt inserted through the through-hole of the first leg portion 111. The second housing 120 is fixed to a second assembly jig (not shown) with the bolt inserted through the through-hole of the second leg portion 121.

Then, the second assembly jig is slid in the axial direction to connect the third connecting portion 138 of the intermediate housing 130 and the fourth connecting portion 128 of the second housing 120. In connecting the third connecting portion 138 and the fourth connecting portion 128, the intermediate housing unit 200 is positioned with reference to the second housing 120 fixed to the second assembly jig. More specifically, the intermediate housing unit 200 is rotated around the axis of the rack shaft 3 to rotate the third connecting portion 138 relative to the fourth connecting portion 128 and thereby mate the third connecting portion 138 with the fourth connecting portion 128. Thus, positions of the female threads formed in the respective bosses 139 of the third connecting portion 138 are aligned with positions of the corresponding through-holes 129 formed in the fourth connecting portion 128. Then, the bolt is screwed to each of the female threads formed in the respective bosses 139 of the third connecting portion 138, fixing the intermediate housing 130 to the second housing 120.

Meanwhile, the first assembly jig is slid in the axial direction to mate the first connecting portion 116 of the first cylindrical portion 112 of the first housing 110 with the second connecting portion 136 of the intermediate cylindrical portion 131 of the intermediate housing 130 and thereby connect the first connecting portion 116 and the second connecting portion 136. A hole diameter of each through-hole 117 formed in the first connecting portion 116 is larger than an outer diameter of a shank of the bolt. The mating portion between the first connecting portion 116 and the second connecting portion 136 has a round shape. This allows for easy alignment between positions of the female threads formed in the respective bosses 137 of the second connecting portion 136 and positions of the corresponding through-holes 117 formed in the first connecting portion 116. Upon alignment between the positions of the female threads formed in the respective bosses 137 of the second connecting portion 136 and positions of the corresponding through-holes 117 formed in the first connecting portion 116, the bolt is screwed to each of the female threads formed in the respective bosses of the first connecting portion 116, fixing the first housing 110 to the intermediate housing 130.

Then, as shown in FIG. 2, the transmission mechanism unit 10 is assembled on the transmission mechanism supporting portion 113 of the first housing 110. First, the sensor housing 15 is fixed to the transmission mechanism supporting portion 113 with bolts, and the pinion shaft 11, the input shaft 12, the torsion bar 13, and the torque sensor 14, which are integrated in advance, are inserted into the transmission mechanism supporting portion 113 and the sensor housing 15. At that time, at least one of the pinion shaft 11 and the rack shaft 3 is rotated to make the pinion 11a formed on the pinion shaft 11 and the rack 3a formed on the rack shaft 3 mesh with each other. Then, the cover 16 is fixed to the sensor housing 15 with bolts.

As described above, the steering device 1 according to the first embodiment includes: the electric motor 21; the rack shaft 3 configured to move in the axial direction; and the driving pulley 22, the balls 23, the ball nut 24, the driven pulley 25, and the belt 27 as an example of the conversion unit 30 configured to convert rotational driving force of the electric motor 21 into movement of the rack shaft 3. The steering device 1 further includes: the first housing 110 configured to cover a part of the outer surface of the rack shaft 3, the first housing 110 including the first leg portion 111 as an example of the first fixed portion configured to be fixed to the vehicle; and the second housing 120 configured to cover a part of the outer surface of the rack shaft 3, the second housing 120 including the fourth connecting portion 128 as an example of the cover portion configured to cover the conversion unit 30 and the second leg portion 121 as an example of the second fixed portion configured to be fixed to the vehicle. The steering device 1 further includes the intermediate housing 130 as an example of the third housing disposed between the first housing 110 and the second housing 120 and configured to cover a part of the outer surface of the rack shaft 3, the intermediate housing 130 including the motor support portion 132 as an example of the support portion configured to support the electric motor 21.

In the above configured steering device 1, the first housing 110 is fixed to the first assembly jig via the first leg portion 111 and the second housing 120 is fixed to the second assembly jig via the second leg portion 121 before the first housing 110, the second housing 120, and the intermediate housing 130 are connected to each other. The intermediate housing 130 (the intermediate housing unit 200) is rotated in the circumferential direction relative to the first housing 110 fixed to the first assembly jig and the second housing 120 fixed to the second assembly jig, whereby the circumferential position of the intermediate housing 130 is determined. Reducing angular phase difference between the first assembly jig and the second assembly jig allows to reduce the parallelism between the mounting surface 111a of the first leg portion 111 to be mounted on the first assembly jig and the mounting surface 121a of the second leg portion 121 to be mounted on the second assembly jig, or in other words, allows to reduce an angular phase between the two mounting surfaces (the mounting surface 111a and the mounting surface 121a) around the axis. Further, the intermediate housing 130 is first connected to the second housing 120 covering the conversion unit 30 before the intermediate housing 130 is connected to the first housing 110. This ensures sealing between the intermediate housing 130 and the second housing 120 covering the conversion unit 30 including the belt 27 and the like. For example, if the second housing 120 and the intermediate housing 130 are connected while being displaced from each other in the circumferential direction, a compression rate (squeeze rate) of the O-ring 128b fitted to the second housing 120 becomes nonuniform, which may impair the sealing function of the O-ring 128b in some portions thereof. In the steering device 1, in contrast, the intermediate housing 130 can be rotated in the circumferential direction relative to the second housing 120 fixed to the second assembly jig, and this allows to reduce displacement between the second housing 120 and the intermediate housing 130. This consequently ensures sealing between the second housing 120 and the intermediate housing 130.

The first housing 110 and the intermediate housing 130 preferably include the first connecting portion 116 and the second connecting portion 136, respectively, each of which is an example of the connecting portion configured to change a relative position thereof in the circumferential direction of the rack shaft 3. This allows a relative position of the intermediate housing 130 of the intermediate housing unit 200 in the circumferential direction to be changed relative to the first housing 110 fixed to the first assembly jig, allowing to connect the first housing 110 and the intermediate housing 130 after the intermediate housing 130 is connected to the second housing 120 first.

The intermediate housing 130 including the motor support portion 132 constitutes the intermediate housing unit 200, which is an example of the housing unit, jointly with the electric motor 21 supported by the motor support portion 132 and with the conversion unit 30 including the driving pulley 22 attached to the output shaft of the electric motor 21, the balls 23 engaged into the ball screw 3b formed on the rack shaft 3, the ball nut 24 forming a moving path for the balls 23 jointly with the ball screw 3b, the driven pulley 25 attached to the ball nut 24, and the belt 27 stretched between the driving pulley 22 and the driven pulley 25. This allows to easily stretch the belt 27 between the driving pulley 22 and the driven pulley 25 and easily adjust tension of the belt 27 before connecting the intermediate housing 130 to the first housing 110 and the second housing 120.

The intermediate housing 130 preferably includes, on its side close to one end of the rack shaft 3, the second connecting portion 136 as an example of the connecting portion configured to change a position thereof relative to the first housing 110, and preferably supports the electric motor 21 and the conversion unit 30 on its side close to the other end of the rack shaft 3. This allows to assemble the steering device 1 by sliding each of the first housing 110 fixed to the first assembly jig and the second housing 120 fixed to the second assembly jig in the axial direction toward the intermediate housing unit 200 that is composed by assembling the electric motor 21 and the conversion unit 30 onto the intermediate housing 130.

The motor mounting surface 133 of the intermediate housing 130 preferably does not overlap any other portion of the intermediate housing 130 in the axial direction of the rack shaft 3. This allows the motor mounting surface 133, which is required to ensure sealing between the motor mounting surface 133 and the electric motor 21 mounted on the motor mounting surface 133, to be easily processed.

Second Embodiment

Figure 6:
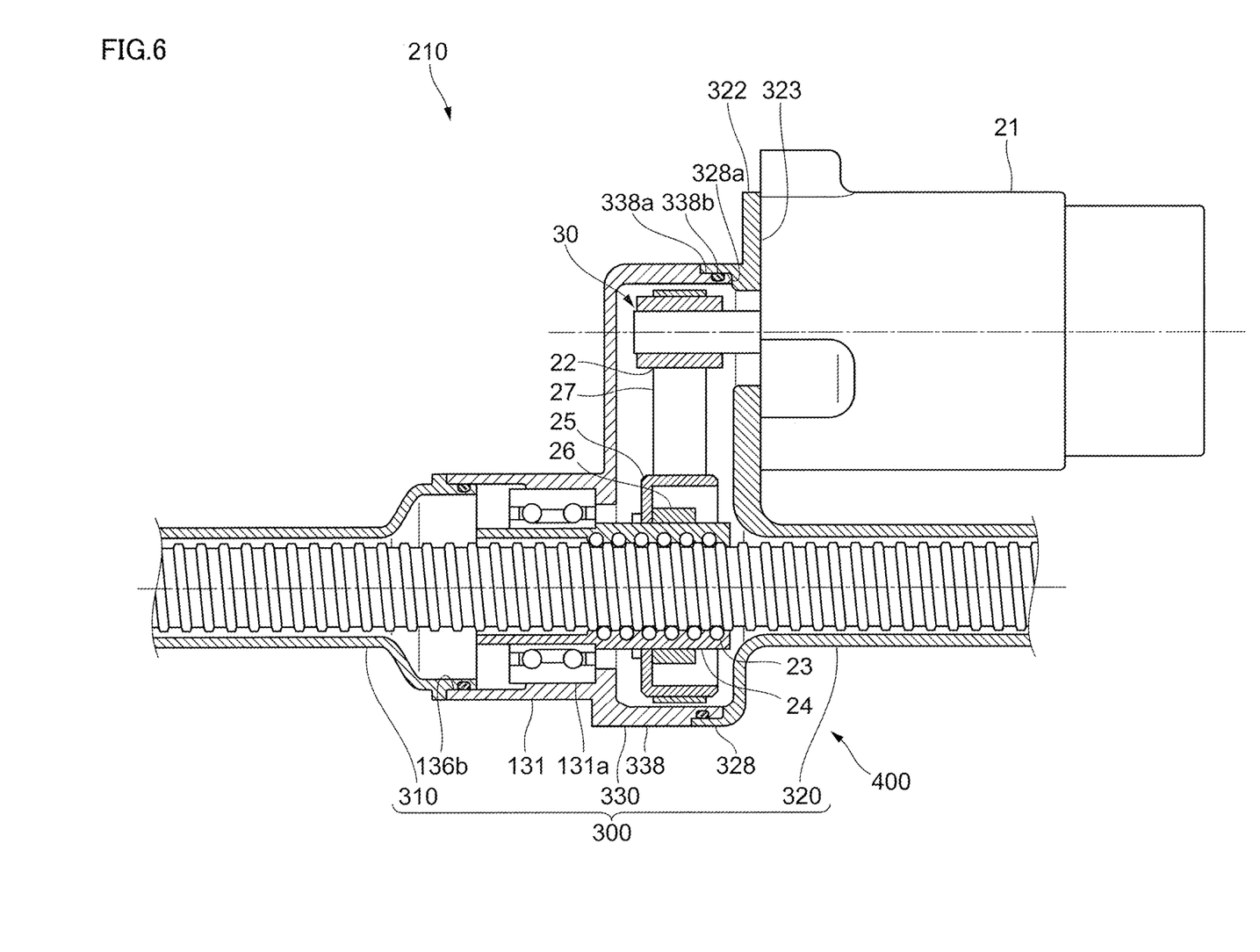
FIG. 6 is a sectional view of a steering device according to a second embodiment.

FIG. 6 is a sectional view of a steering device 210 according to the second embodiment.

The steering device 210 according to the second embodiment includes a housing 300 that is composed of the following three housings divided in the axial direction: a first housing 310 including the first leg portion 111 (see FIG. 1), a second housing 320 including the second leg portion 121 (see FIG. 1), and an intermediate housing 330 disposed between the first housing 310 and the second housing 320. Differences from the steering device 1 according to the first embodiment lie in that the second housing 320 includes a motor support portion 322 for supporting the electric motor 21 and a second housing unit 400 is constituted by the second housing 320, the electric motor 21, the conversion unit 30 and the like. Below a description will be given of the differences from the steering device 1 according to the first embodiment. The same structures and functions between the steering device 1 according to the first embodiment and the steering device 210 according to the second embodiment are denoted by the respective same reference numerals and detailed description thereof will be omitted.

The intermediate housing 330 is provided, at its end facing the second housing 320, with a third connecting portion 338 that connects to an end of the second housing 320 facing the intermediate housing 330.

The second housing 320 is provided, at its end facing the intermediate housing 330, with a fourth connecting portion 328 that connects to the third connecting portion 338 of the intermediate housing 330.

The third connecting portion 338 of the intermediate housing 330 and the fourth connecting portion 328 of the second housing 320 are connected to each other to form an accommodating portion accommodating the conversion unit 30. The driving pulley 22, the driven pulley 25, and the belt 27 supported by the second housing 320 protrude from the fourth connecting portion 328 to the outside, and the outer periphery of the belt 27 is covered with the third connecting portion 338 of the intermediate housing 330.

When viewed in the axial direction, the third connecting portion 338 of the intermediate housing 330 and the fourth connecting portion 328 of the second housing 320, in other words the accommodating portion, have a shape contoured to the shape of the outer peripheral surface of the endless belt 27 stretched between the driving pulley 22 and the driven pulley 25 of the assist unit 20, as shown in FIG. 4. The driving pulley 22, the driven pulley 25, and the belt 27 of the assist unit 20 protrude from the fourth connecting portion 128 to the outside, and the outer periphery of the belt 27 is covered with the third connecting portion 138 of the intermediate housing 330.

The fourth connecting portion 328 of the second housing 320 includes multiple (six in the present embodiment) bosses (not shown) each formed with a female thread to be screwed with a bolt for fixing the third connecting portion 338 of the intermediate housing 330. Meanwhile, the third connecting portion 338 of the intermediate housing 330 is formed with through-holes (not shown), each for insertion of the corresponding bolt, in the same number as the bosses (six in the present embodiment).

The third connecting portion 338 of the intermediate housing 330 includes a third protrusion 338a protruding from a mating surface of the third connecting portion 338 at which the third connecting portion 338 mates with the fourth connecting portion 328 of the second housing 320. Meanwhile, the fourth connecting portion 328 of the second housing 320 is formed with a fourth recess 328a extending inward from a mating surface of the fourth connecting portion 328 at which the fourth connecting portion 328 mates with the third connecting portion 338 of the intermediate housing 330. When viewed in the axial direction, the third protrusion 338a of the third connecting portion 338 and the fourth recess 328a of the fourth connecting portion 328 have a shape contoured to the shape of the outer peripheral surface of the belt 27, as shown in FIG. 4. The third protrusion 338a of the third connecting portion 338 is fitted with an O-ring 338b around its outer periphery. The third connecting portion 338 and the fourth connecting portion 328 are connected to each other with the third protrusion 338a of the third connecting portion 338 fitted into the fourth recess 328a of the fourth connecting portion 328. The O-ring 338b seals a gap between the third protrusion 338a of the third connecting portion 338 and the fourth recess 328a of the fourth connecting portion 328.

(Assembly Method)

The electric motor 21 is mounted on the motor mounting surface 323 of the motor support portion 322 of the second housing 320, and the driving pulley 22 is attached to the output shaft of the electric motor 21.

The rack shaft 3 having the balls 23 and the ball nut 24 attached to the ball screw 3b formed on the rack shaft 3 is fitted into the second cylindrical portion 122 of the second housing 320. Then, the driven pulley 25 is attached to an outer surface of the ball nut 24.

Then, the belt 27 is stretched between the driving pulley 22 and the driven pulley 25, and tension of the belt 27 is adjusted.

The driving pulley 22 attached to the output shaft of the electric motor 21 and the driven pulley 25 attached to the outer surface of the ball nut 24 protrude from the fourth connecting portion 328 of the second housing 320 to the outside. This allows the belt 27 to be easily stretched between the driving pulley 22 and the driven pulley 25 and also allows tension of the belt 27 to be easily adjusted.

Through the above work, the second housing unit 400 including the second housing 320, the electric motor 21, and the conversion unit 30 (the driving pulley 22, the driven pulley 25, the balls 23, and the ball nut 24) is assembled.

The first housing 310 is fixed to the first assembly jig (not shown) with the bolt inserted through the through-hole of the first leg portion. The second housing 320 is fixed to a second assembly jig (not shown) with the bolt inserted through the through-hole of the second leg portion 121. The second housing 320 may be fixed to the second assembly jig before the electric motor 21, the conversion unit 30 and the like are assembled onto the second housing 320.

Then, the second assembly jig is slid in the axial direction to connect the third connecting portion 338 of the intermediate housing 330 and the fourth connecting portion 328 of the second housing 320. In connecting the third connecting portion 338 and the fourth connecting portion 328, the intermediate housing 330 is positioned with reference to the second housing 320 fixed to the second assembly jig. More specifically, the intermediate housing 330 is rotated around the axis of the rack shaft 3 to rotate the third connecting portion 338 relative to the fourth connecting portion 328 and thereby mate the third connecting portion 338 with the fourth connecting portion 328. Thus, positions of the female threads formed in the respective bosses (not shown) of the fourth connecting portion 328 are aligned with positions of the corresponding through-holes (not shown) formed in the third connecting portion 338. Then, the bolt is screwed to each of the female threads formed in the respective bosses of the fourth connecting portion 328, fixing the intermediate housing 330 to the second housing 320.

The method for connecting the first housing 310 and the intermediate housing 330 and the method for assembling the transmission mechanism unit 10 onto the transmission mechanism supporting portion 113 of the first housing 310 are similar to those in the first embodiment, and accordingly detailed description of these methods have been omitted.

As described above, the steering device 210 according to the second embodiment includes: the electric motor 21; the rack shaft 3 configured to move in the axial direction; and the conversion unit 30 configured to convert rotational driving force of the electric motor 21 into movement of the rack shaft 3. The steering device 210 further includes: the first housing 310 configured to cover a part of the outer surface of the rack shaft 3, the first housing 310 including the first leg portion 111 as an example of the first fixed portion configured to be fixed to the vehicle; and the second housing 320 configured to cover a part of the outer surface of the rack shaft 3, the second housing 320 including the motor support portion 322 as an example of the support portion configured to support the electric motor 21 and the second leg portion 121 as an example of the second fixed portion fixed to the vehicle. The steering device 210 further includes the intermediate housing 330 as an example of the third housing disposed between the first housing 310 and the second housing 320 and configured to cover a part of the outer surface of the rack shaft 3, the intermediate housing 330 including the third connecting portion 338 as an example of the cover portion configured to cover the conversion unit 30.

In the above configured steering device 210, the first housing 310 is fixed to the first assembly jig via the first leg portion 111 and the second housing 320 is fixed to the second assembly jig via the second leg portion 121 before the first housing 310, the second housing 320, and the intermediate housing 330 are connected to each other. The intermediate housing 330 is rotated in the circumferential direction relative to the first housing 310 fixed to the first assembly jig and the second housing 320 fixed to the second assembly jig, whereby the circumferential position of the intermediate housing 330 is determined. Reducing angular phase difference between the first assembly jig and the second assembly jig allows to reduce the parallelism between the mounting surface 111a of the first leg portion 111 to be mounted on the first assembly jig and the mounting surface 121a of the second leg portion 121 to be mounted on the second assembly jig, or in other words, allows to reduce an angular phase between the two mounting surfaces (the mounting surface 111a and the mounting surface 121a) around the axis. Further, the intermediate housing 330 covering the conversion unit 30 is first connected to the second housing 320 before the intermediate housing 330 is connected to the first housing 310. This ensures sealing between the intermediate housing 330 covering the conversion unit 30 including the belt 27 and the like and the second housing 320.

Here, the second housing 320 preferably supports the electric motor 21 and the conversion unit 30 at its side closer to the intermediate housing 330 than the second leg portion 121. This allows to easily stretch the belt 27 between the driving pulley 22 and the driven pulley 25 and easily adjust tension of the belt 27 before connecting the intermediate housing 330 and the second housing 320.

The motor mounting surface 323 of the second housing 320 preferably does not overlap any other portion of the second housing 320 in the axial direction of the rack shaft 3. This allows the motor mounting surface 323, which is required to ensure sealing between the motor mounting surface 323 and the electric motor 21 mounted on the motor mounting surface 323, to be easily processed.

Third Embodiment

Figure 7:
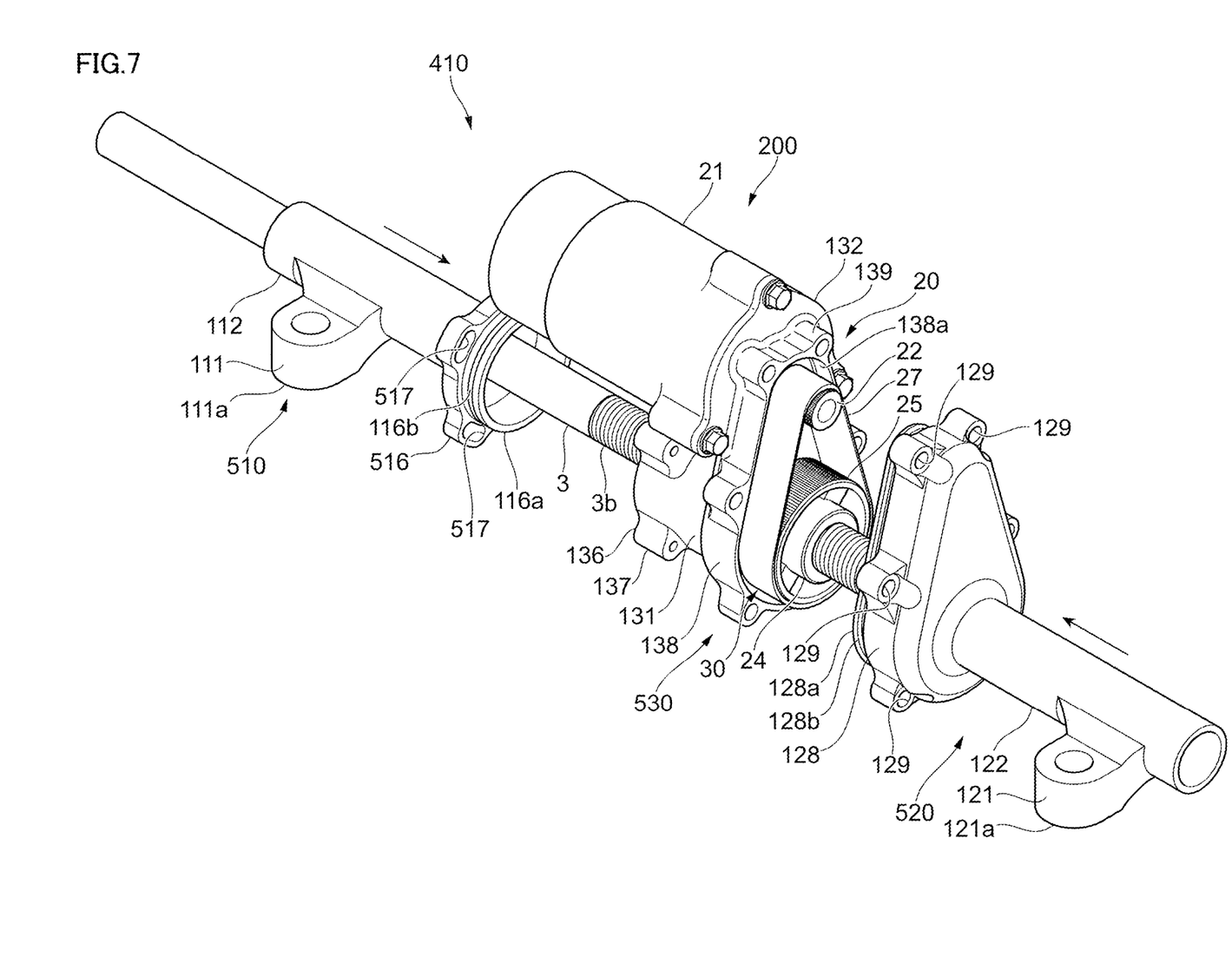
FIG. 7 is a schematic configuration diagram of a steering device according to a third embodiment.

FIG. 7 is a schematic configuration diagram of a steering device 410 according to a third embodiment.

In the steering device 1 according to the first embodiment and the steering device 210 according to the second embodiment described above, female threads each to be screwed with a bolt are formed in the respective bosses 137 of the second connecting portion 136 of the intermediate housing 130, and the cylindrical through-holes 117 each for insertion of the bolt are formed in the first connecting portion 116 of the first housing 110. However, the shape of each through-hole 117 formed in the first connecting portion 116 of the first housing 110 is not limited to the cylindrical shape (perfect circle shape as viewed in the axial direction).

The steering device 410 according to the third embodiment includes a housing 500 that is composed of the following three housings divided in the axial direction: a first housing 510 including the first leg portion 111, a second housing 520 including the second leg portion 121, and an intermediate housing 530 disposed between the first housing 510 and the second housing 520. As shown in FIG. 7, the shape of each through-hole 517 formed in the first housing 510 is different from that in the steering device 1 according to the first embodiment and that in the steering device 210 according to the second embodiment. Below a description will be given of the differences from the steering device 1 according to the first embodiment. The same structures and functions between the steering device 1 according to the first embodiment and the steering device 410 according to the third embodiment are denoted by the respective same reference numerals and detailed description thereof will be omitted.

Each of the through-holes 571 formed in a first connecting portion 516 of the first housing 510 of the steering device 410 according to the third embodiment has an arc shape around the axis of the rack shaft 3 when viewed in the axial direction. This allows positions of the through-holes 517 formed in the first connecting portion 516 to be easily aligned with positions of corresponding female threads formed in the respective bosses 137 of the second connecting portion 136 after the intermediate housing 530 and the second housing 520 are fixed to each other. This in turn allows the first housing 510 and the intermediate housing 530 to be fixed to each other even when there is a large parallelism between the mounting surface 111a of the first leg portion 111 to be mounted on the first assembly jig and the mounting surface 121a of the second leg portion 121 to be mounted on the second assembly jig (i.e., even when there is a large angular phase between the two mounting surfaces around the axis).

While, in the first to third embodiments described above, the female threads each to be screwed with the bolt are formed in the respective bosses 137 of the second connecting portion 136 and the through-holes 117 (or the through-holes 517) each for insertion of the bolt are formed in the first connecting portion 116, the present invention is not limited to these embodiments. For example, the female threads each to be screwed with the bolt may be formed in the first connecting portion 116 and the through-holes 117 (or the through-holes 517) each for insertion of the bolt may be formed in the second connecting portion 136.

REFERENCE SIGNS LIST 1, 210, 410 Electric power steering device
3 Rack shaft
100, 300, 500 Housing
111 First leg portion
110, 310, 510 First housing
121 Second leg portion
120, 320, 520 Second housing
130 Intermediate housing
22 Driving pulley
25 Driven pulley
27 Belt

The invention claimed is:

1. An electric power steering device comprising:
an electric motor;
a rack shaft configured to move in an axial direction;
a conversion unit configured to convert rotational driving force of the electric motor into movement of the rack shaft;
a first housing configured to cover a part of an outer surface of the rack shaft, the first housing including a first fixed portion configured to be fixed to a vehicle;
a second housing configured to cover a part of the outer surface of the rack shaft, the second housing including a cover portion configured to cover the conversion unit, the second housing including a second fixed portion configured to be fixed to the vehicle; and
a third housing disposed between the first housing and the second housing and configured to cover a part of the outer surface of the rack shaft, the third housing including a support portion configured to support the electric motor, wherein
the support portion includes a motor mounting surface on which the electric motor is mounted via a plurality of bolts, said support portion having a plurality of through-holes into which the plurality of bolts are inserted,
the first housing includes a first connecting portion,
the third housing includes a second connection portion and a third connecting portion,
the second housing includes a fourth connecting portion,
the first connecting portion and the second connecting portion are connected such that their relative positions are configured to change in a circumferential direction of the rack shaft,
an O-ring is fitted between the first connecting portion and the second connecting portion, and
another O-ring is fitted between the third connecting portion and the fourth connecting portion.

2. The electric power steering device according to claim 1, wherein
a female thread is provided to one of the first connecting portion and the second connecting portion, and
an arc-shaped through-hole is formed in a flange provided to the other of the first connecting portion and the second connecting portion.

3. The electric power steering device according to claim 2, wherein the third housing constitutes a housing unit jointly with the electric motor supported by the support portion and with the conversion unit including a driving pulley attached to an output shaft of the electric motor, a driven pulley attached to the rack shaft, and a belt stretched between the driving pulley and the driven pulley.

4. The electric power steering device according to claim 3, wherein
the second connecting portion is provided at a side of the third housing close to one end of the rack shaft and is configured to support the electric motor and the conversion unit at a side of the third housing close to the other end of the rack shaft.

5. The electric power steering device according to claim 4, wherein
the third housing has the motor mounting surface for the electric motor, the mounting surface being configured not to overlap any other portion of the housing in the axial direction of the rack shaft.

6. The electric power steering device according to claim 3, wherein
the third housing has the motor mounting surface for the electric motor, the mounting surface being configured not to overlap any other portion of the housing in the axial direction of the rack shaft.

7. The electric power steering device according to claim 2, wherein
the third housing has the motor mounting surface for the electric motor, the mounting surface being configured not to overlap any other portion of the housing in the axial direction of the rack shaft.

8. The electric power steering device according to claim 1, wherein
the third housing constitutes a housing unit jointly with the electric motor supported by the support portion and with the conversion unit including a driving pulley attached to an output shaft of the electric motor, a driven pulley attached to the rack shaft, and a belt stretched between the driving pulley and the driven pulley.

9. The electric power steering device according to claim 8, wherein
the third housing has the motor mounting surface for the electric motor, the mounting surface being configured not to overlap any other portion of the housing in the axial direction of the rack shaft.

10. The electric power steering device according to claim 8, wherein the third housing includes the second connecting portion at a side thereof close to one end of the rack shaft and is configured to support the electric motor and the conversion unit at a side thereof close to the other end of the rack shaft.

11. The electric power steering device according to claim 10, wherein
the third housing has the motor mounting surface for the electric motor, the mounting surface being configured not to overlap any other portion of the housing in the axial direction of the rack shaft.

12. The electric power steering device according to claim 1, wherein
the motor mounting surface is configured not to overlap any other portion of the third housing in the axial direction of the rack shaft.

13. An electric power steering device comprising:
an electric motor;
a rack shaft configured to move in an axial direction;
a conversion unit configured to convert rotational driving force of the electric motor into movement of the rack shaft;
a first housing configured to cover a part of an outer surface of the rack shaft, the first housing including a first fixed portion configured to be fixed to a vehicle;
a second housing configured to cover a part of the outer surface of the rack shaft, the second housing including a cover portion configured to cover the conversion unit, the second housing including a second fixed portion configured to be fixed to the vehicle; and
a third housing disposed between the first housing and the second housing and configured to cover a part of the outer surface of the rack shaft, the third housing including a support portion configured to support the electric motor, wherein
the support portion includes a motor mounting surface on which the electric motor is mounted via a plurality of bolts, said support portion having a plurality of through-holes into which the plurality of bolts are inserted,
the third housing constitutes a housing unit jointly with the electric motor supported by the support portion and with the conversion unit including a driving pulley attached to an output shaft of the electric motor, a driven pulley attached to the rack shaft, and a belt stretched between the driving pulley and the driven pulley,
the third housing includes, at a side thereof close to one end of the rack shaft, a second connecting portion configured to change a position thereof relative to a first connecting portion of the first housing, and the third housing is configured to support the electric motor and the conversion unit at a side thereof close to the other end of the rack shaft,
an O-ring is fitted between the first connecting portion and the second connecting portion,
the third housing includes a third connecting portion,
the second housing includes a fourth connecting portion, and
another O-ring is fitted between the third connecting portion and the fourth connecting portion.

14. The electric power steering device according to claim 13, wherein
the third housing includes the motor mounting surface for the electric motor, the mounting surface being configured not to overlap any other portion of the third housing in the axial direction of the rack shaft.

15. An electric power steering device comprising:
an electric motor;
a rack shaft configured to move in an axial direction;
a conversion unit configured to convert rotational driving force of the electric motor into movement of the rack shaft;
a first housing configured to cover a part of an outer surface of the rack shaft, the first housing including a first fixed portion configured to be fixed to a vehicle;
a second housing configured to cover a part of the outer surface of the rack shaft, the second housing including a cover portion configured to cover the conversion unit, the second housing including a second fixed portion configured to be fixed to the vehicle; and
a third housing disposed between the first housing and the second housing and configured to cover a part of the outer surface of the rack shaft, the third housing including a support portion configured to support the electric motor, wherein
the support portion includes a motor mounting surface on which the electric motor is mounted via a plurality of bolts, said support portion having a plurality of through-holes into which the plurality of bolts are inserted,
an O-ring is fitted at a connecting portion between the first housing and the third housing,
another O-ring is fitted at a connecting portion between the second housing and the third housing, and
the third housing constitutes a housing unit jointly with the electric motor supported by the support portion and with the conversion unit including a driving pulley attached to an output shaft of the electric motor, a driven pulley attached to the rack shaft, and a belt stretched between the driving pulley and the driven pulley.

* * * * *